United States Patent [19]

Olson et al.

[11] Patent Number: 4,661,265

[45] Date of Patent: Apr. 28, 1987

[54] CATALYST DEOILING PROCESS

[75] Inventors: Carl B. Olson, Wheaton; Roman T. Plichta, Naperville; Daniel W. Coyne, Naperville, all of Ill.

[73] Assignee: Amoco Corporation, Chicago, Ill.

[21] Appl. No.: 781,916

[22] Filed: Sep. 30, 1985

[51] Int. Cl.$^4$ ............................................. B01D 21/00
[52] U.S. Cl. ..................................... 210/804; 210/806
[58] Field of Search .................... 502/20, 56; 208/177, 208/179, 180, 370; 196/155; 210/415, 112, 767, 800, 801, 802–806; 209/171, 155

[56] References Cited

U.S. PATENT DOCUMENTS 1,024,230  4/1912  Turner et al. ......................... 210/415

Primary Examiner—Frank Sever
Attorney, Agent, or Firm—Thomas W. Tolpin; William H. Magidson; Ralph C. Medhurst

[57] ABSTRACT

An improved deoiling process is provided for removing substantial amounts of oil from spent catalyst withdrawn from resid hydrotreating units. In the process, a slurry of spent catalyst and oil is spirally conveyed at an upward angle of inclination in a spiral classifier. Oil is drained from the upwardly spiraling slurry to substantially separate the oil from the spent catalyst. The deoiled catalyst is discharged into a catalyst bin. Preferably, the bin is continuously weighed as the deoiled catalyst is discharged into the bin. The flow of deoiled catalyst into the bin is stopped when the weight of the catalyst-laden bin has reached a preselected weight.

14 Claims, 10 Drawing Figures

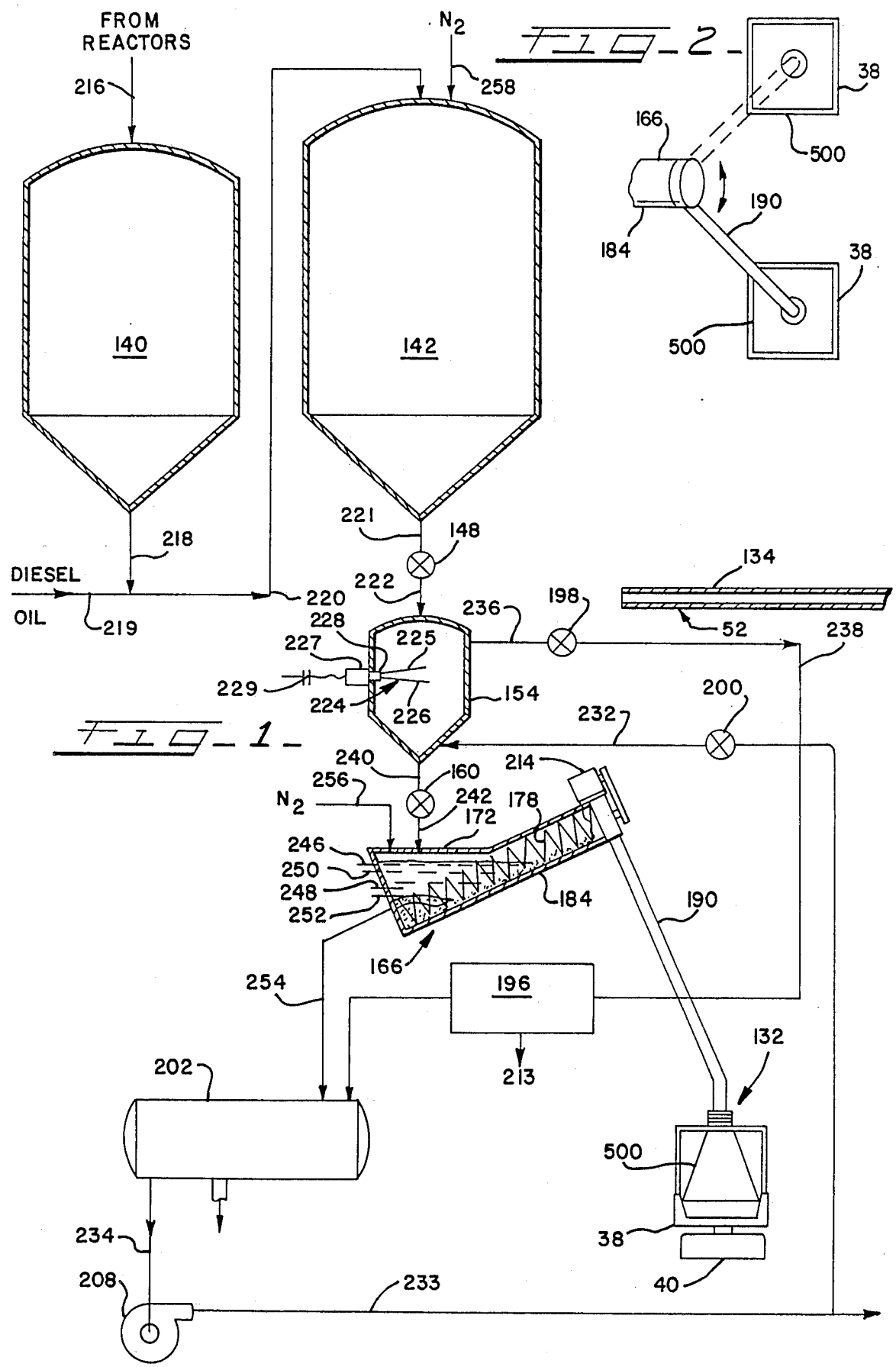

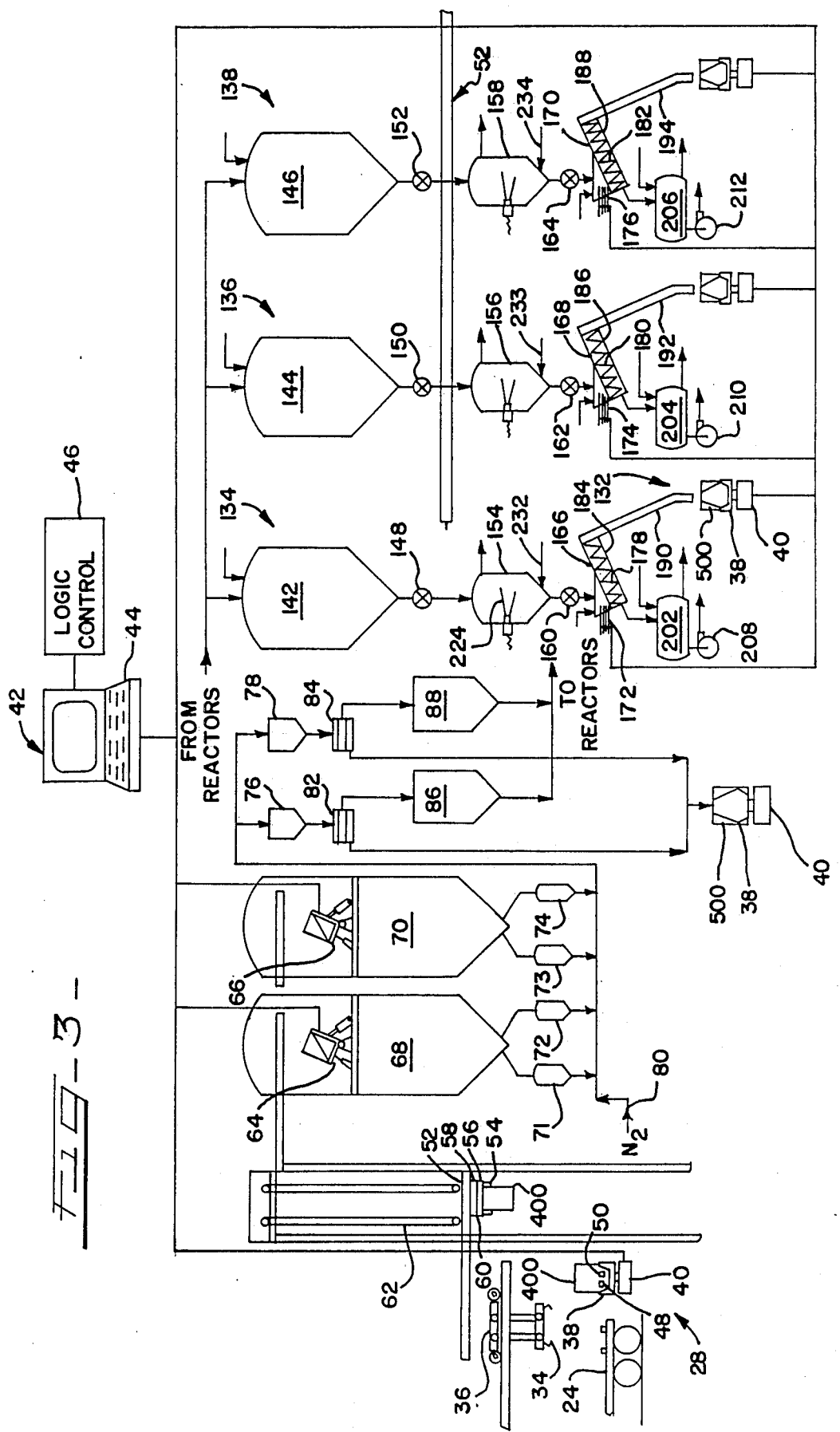

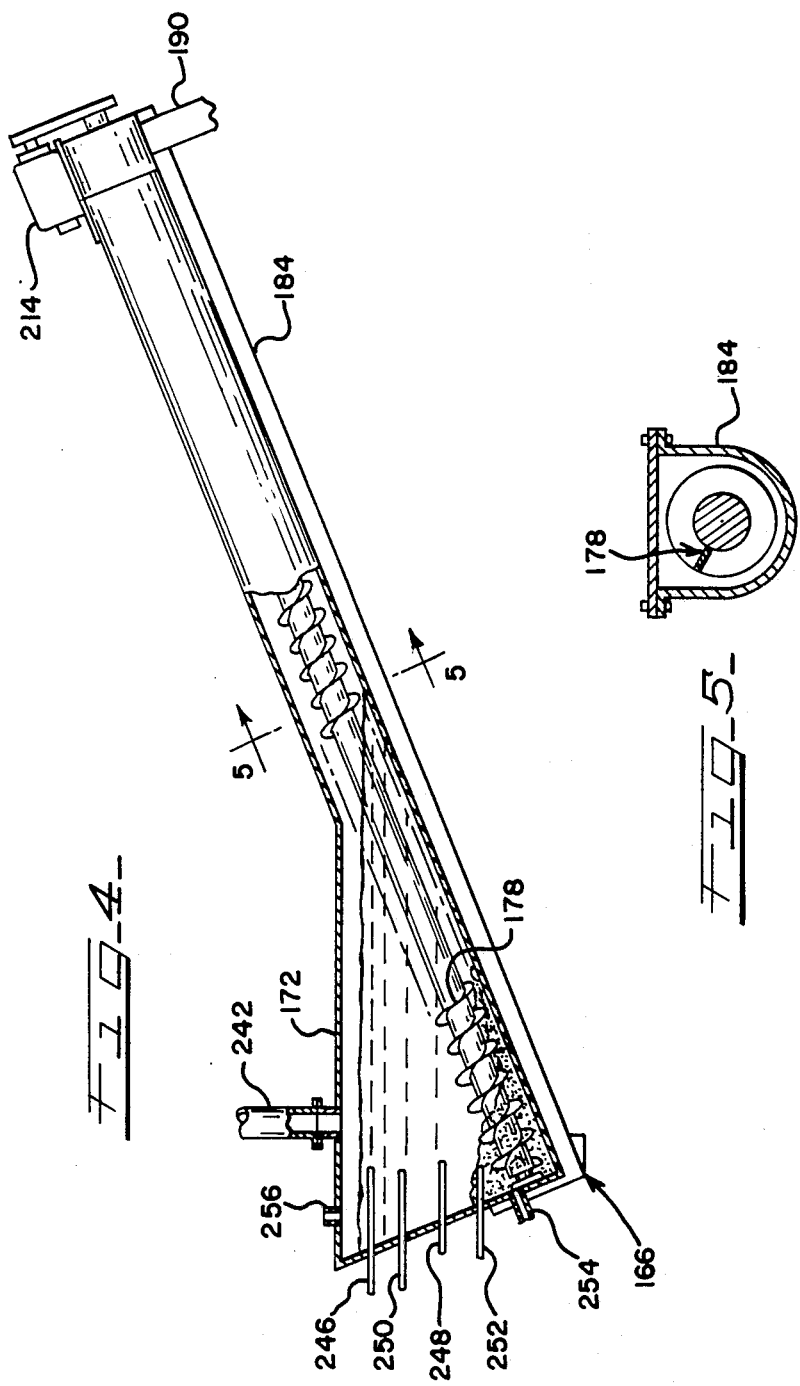

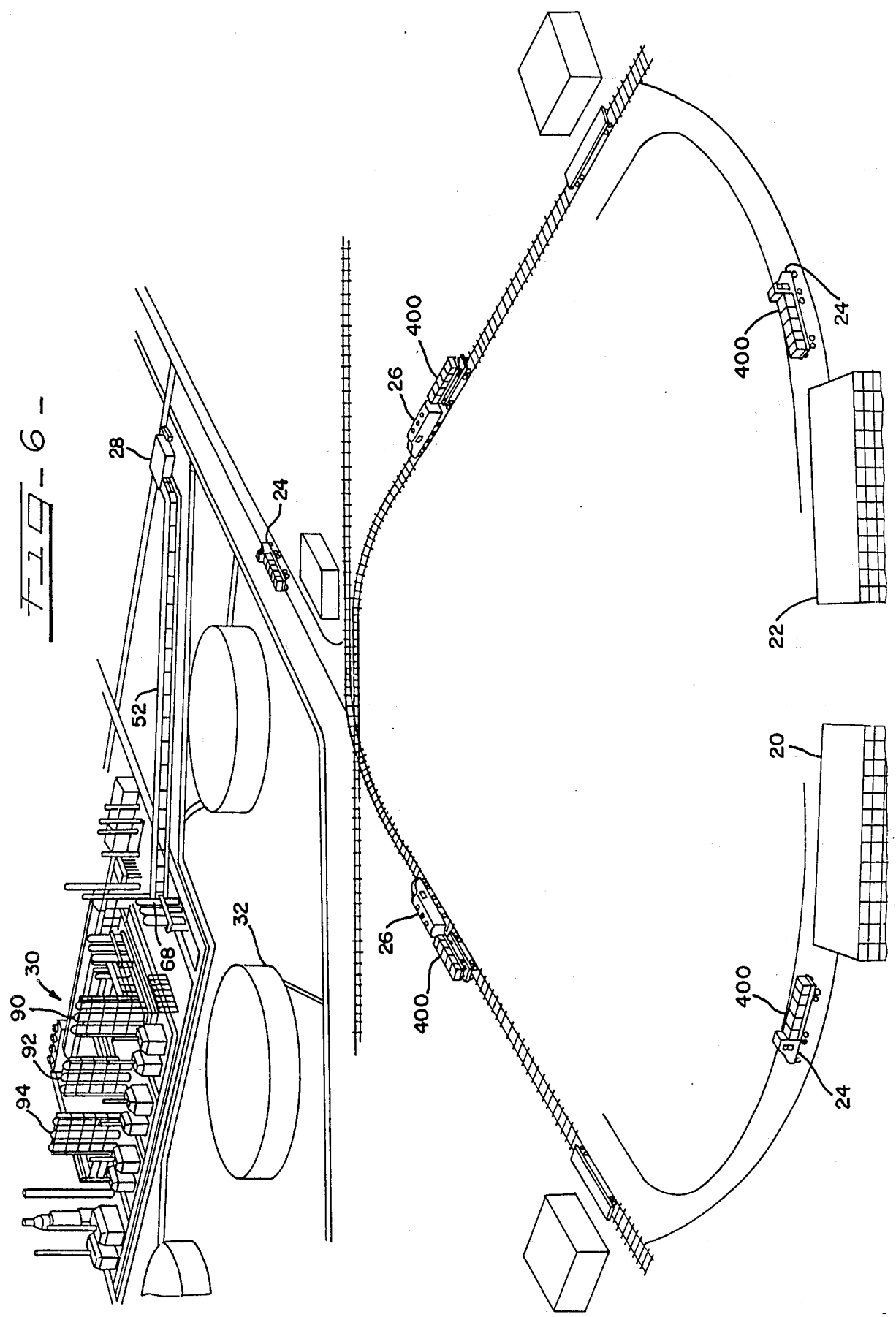

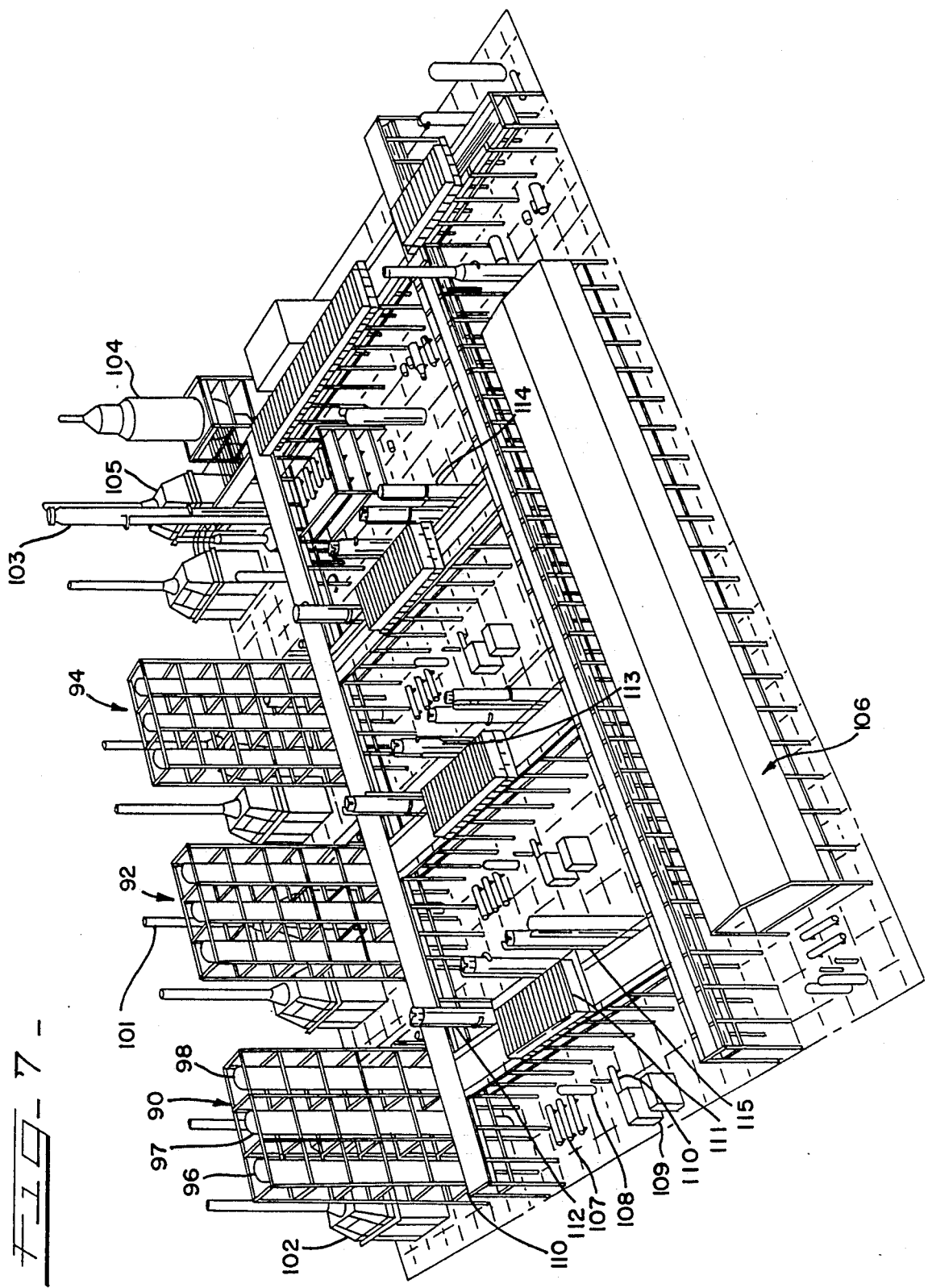

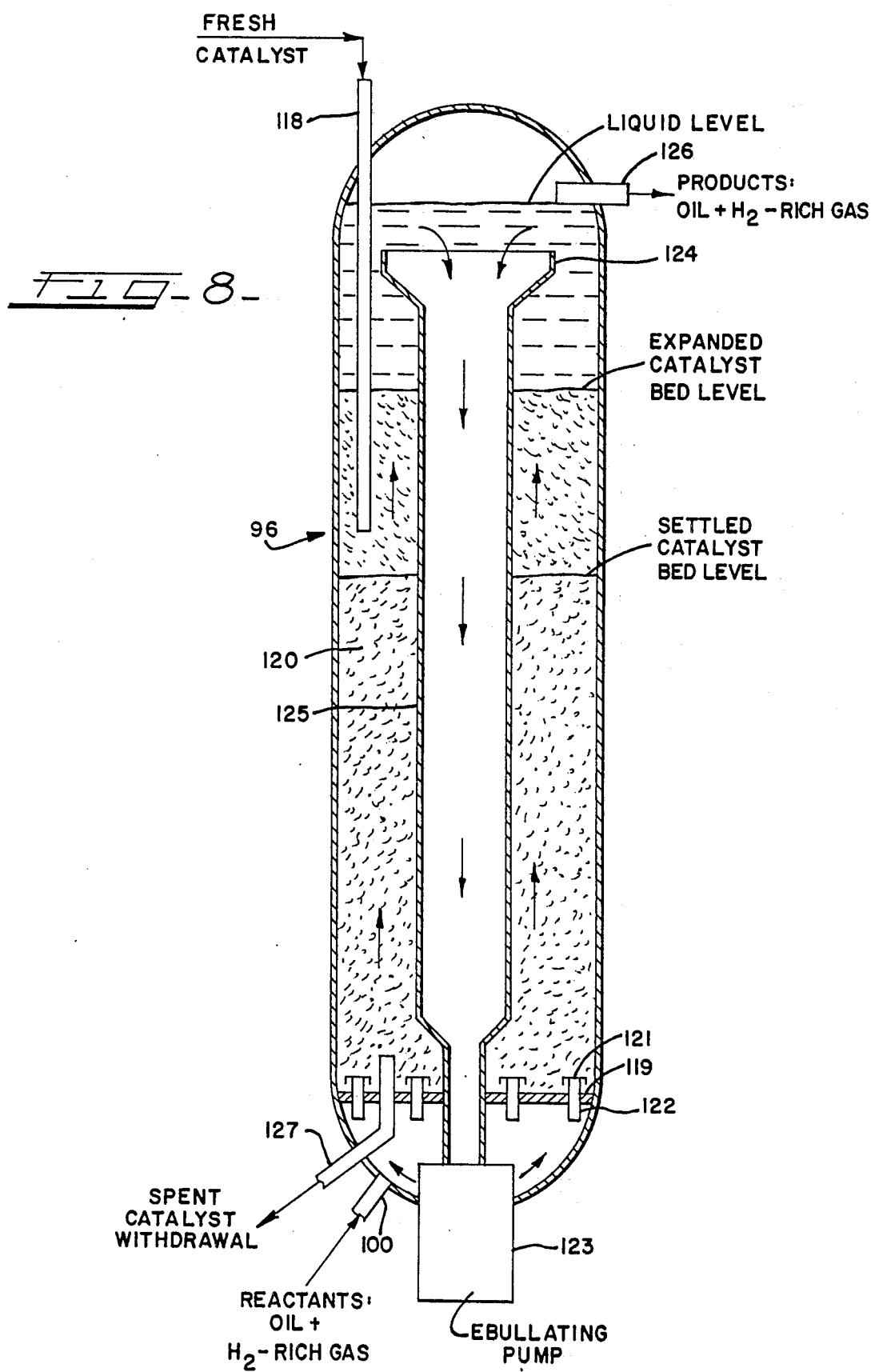

CATALYST DEOILING PROCESS

BACKGROUND OF THE INVENTION

This invention relates to deoiling, and more particularly, to removing oil from spent catalysts.

Spiraling oil costs, extensive price fluctuations, and artificial output limitations by the cartel of oil producing countries (OPEC) have created instability and uncertainty for net oil consuming countries, such as the United States, to attain adequate supplies of high quality, low-sulfur, petroleum crude oil (sweet crude) from Saudi Arabia, Nigeria, and other countries, at reasonable prices for conversion into gasoline, fuel oil, and petrochemical feedstocks. In an effort to stabilize the supply and availability of crude oil at reasonable prices, Amoco Oil Company has developed, constructed, and commercialized within the past year extensive, multi-million dollar refinery projects under the Second Crude Replacement Program (CRP II) to process poorer quality, high-sulfur, petroleum crude oil (sour crude) and demetallate, desulfurize, and hydrocrack resid, to produce high value products, such as gasoline, distillates, catalytic cracker feed, coke, and petroleum feedstocks. The Crude Replacement Program is of great benefit to the oil consuming nations by providing for the availability of adequate supplies of gasoline and other petroleum products at reasonable prices while protecting the downstream operations of oil refining companies.

Amoco Oil Company's Crude Replacement Program advantageously utilizes ebullated expanded bed reactors for its resid hydrotreating units (RHU). In ebullated bed reactors, oil and hydrogen flow upward through a fixed amount of catalyst. The oil flows upwardly through the catalyst bed at a sufficient velocity to expand and maintain the catalyst in a state of random ebullated motion. Ebullated bed reactors were selected over fixed bed reactors because of the ebullated bed reactor's ability to economically process more types of feedstocks as well as their ability to readily adapt to changes in the feedstocks' composition. Ebullated bed reactors desirably accommodate the addition and the withdrawal of catalyst onstream during regular use and operation without shutting down the unit and they also minimize bed plugging.

The successful commercialization and use of ebullated bed reactors requires large amounts of catalyst to be transported to and removed from the ebullated bed reactors daily. It also requires that used spent catalyst be deoiled before being shipped to a reclamation site or disposal area to protect the environment by preventing oil from dripping, spilling, and accumulating on the nation's highways as well as to maximize product yield. In order to safeguard and protect the reactors and associated refinery equipment, it is desirable to restrict trucks from driving anywhere close to the reactors and associated equipment. All of the above requirements create an enormous materials handling problem.

Over the years, many methods for processing oil, separating liquids and solids, and classifying an assortment of materials have been suggested using various augers, screw conveyers, and other classifiers. Typifying these methods are those found in U.S. Pat. Nos. 246,706, 989,915, 1,109,728, 1,685,534, 1,694,361, 2,074,988, 2,090,191, 2,189,419, 2,427,388, 2,457,461, 2,547,577, 2,662,851, 2,772,224, 2,792,098, 2,804,670, 2,886,902, 2,909,872, 2,987,185, 3,031,807, 3,170,770, 3,227,261, 3,242,057, 3,243,264, 3,322,,283, 3,498,839, 3,616,932, 3,804,670, 4,002,559, 4,125,437, 4,287,058, 4,311,561, 4,335,363, and 4,384,955. These methods have met with varying degrees of success.

It is, therefore, desirable to provide an improved deoiling process for use with resid hydrotreating units which overcomes many of the above problems.

SUMMARY OF THE INVENTION

An improved deoiling process is provided for removing substantial amounts of oil from used spent catalyst, such as from resid hydrotreating units. Advantageously, the deoiling process is effective, efficient, and environmentally beneficial.

In the novel deoiling process, a slurry of spent catalyst and reactor oil is initially cooled to a temperature below the flash point of the oil. While the slurry can be water-cooled, it is preferably oil-cooled. The catalyst-oil slurry is then conveyed at an upward angle of inclination by a screw conveyer or spiral classifier. The slurry can be conveyed (augered) in a spiral or helical flow pattern. During conveying, the oil is separated and drained from the slurry and discharged into a bin. Preferably, the deoiled catalyst is discharged by gravity at an inclined angle into the bin.

In the preferred deoiling process, fresh catalyst is fluidly conveyed in a heavy vacuum gas-oil slurry to a reactor train comprising a series of three ebullated bed reactors. High sulfur resid is fed to the reactors and the reactors are injected with hydrogen. The resid is hydrotreated and ebullated in the reactors in the presence of catalyst and hydrogen to produce an upgraded effluent product stream comprising reactor oil leaving spent catalyst. The product stream is separated in an atmospheric tower into fractions of gas and oil including a fraction of mid-distillate diesel oil. A slurry of spent catalyst and reactor oil is withdrawn from the reactors and fed to a high-pressure catalyst-transfer vessel where the slurry is cooled to a temperature above the flash point of the mid-distillate diesel oil. The slurry is then conveyed with part of the mid-distillate oil to an inventory vessel where it is gravitated to a cooling drum and vessel.

The amount of spent catalyst in the cooling drum can be monitored, preferably electronically by a vibrating tuning fork probe. The flow of slurry into the cooling drum from the inventory vessel is stopped when the amount of spent catalyst sensed by the vibrating tuning fork probe has reached a preselected level. Unexpectedly, the tuning fork probe achieved superior, surprisingly good results over conventional prior art detection equipment even though tuning fork probes are not normally used with catalyst and oil slurries.

The slurry in the cooling drum is cooled to a temperature below the flash point of the diesel oil by circulating a cooling oil, such as cooled mid-distillate oil, in the cooling drum in direct heat exchange contact with the slurry. The effluent cooling oil is withdrawn from the cooling drum and circulated through a water-cooled heat exchanger to substantially lower the temperature of the cooling oil. The cooled oil is subsequently pumped to a surge drum.

The cooled slurry in the cooling drum is conveyed by gravity flow to the feed hopper of a spiral classifier. The slurry is spirally conveyed at an upward angle of inclination by the spiral classifier while a substantial amount of mid-distillate diesel oil is simultaneously drained and removed from the spent catalyst to substantially deoil the catalyst. The removed oil is conveyed at a downward angle of inclination by gravity flow through the screw-conveyer housing-section of the spiral classifier to the feed hopper in general countercurrent flow relation to the inclined upwardly conveying slurry. The removed oil in the feed hopper is drained and recycled to the surge drum.

Deoiled catalyst gravitates downwardly from the spiral classifier through an inclined discharge chute into the top of a spent catalyst container. The weight of the spent catalyst container is continuously sensed while the deoiled catalyst is being loaded into the container. The flow of deoiled catalyst into the container is stopped when the sensed weight of the container has reached a preselected level below the maximum allowed load under applicable state and local highway regulations and the maximum load-bearing capabilities of the transport vehicles.

In the illustrative embodiment, the feed hopper and the inventory vessel are blanketed with nitrogen to help prevent oxygen influx into the vessels.

After the containers are loaded with deoiled catalyst, they are removed by a special remote-controlled, computerized, overhead monorail.

A more detailed explanation of the invention is provided in the following description and appended claims taken in conjunction with the accompanying drawings.

BRIEF DESCRIPTIONS OF THE DRAWINGS

FIG. 1 is a schematic flow diagram of a deoiling process in accordance with principles of the present invention;

FIG. 2 is a fragmentary top view of the discharge chute and tops of the spent catalyst containers;

FIG. 3 is a schematic flow diagram of the deoiling process and other portions of the catalyst handling system;

FIG. 4 is an enlarged fragmentary side view of the spiral classifier;

FIG. 5 is a cross-sectional view of the spiral classifier taken substantially along line 5—5 of FIG. 4;

FIG. 6 is a perspective view of the catalyst handling system;

FIG. 7 is a perspective view of the resid hydrotreating units and associated refinery equipment;

FIG. 8 is a cross-sectional view of an ebullated bed reactor; and

DETAILED DESCRIPTION OF THE PREFERRED EMBODIMENT

Figure 9:
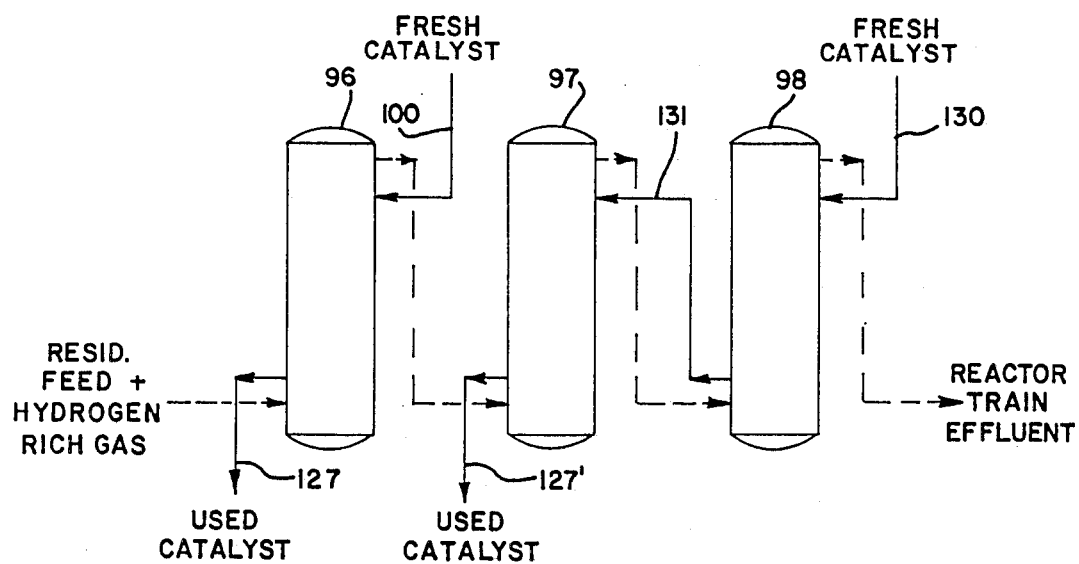
FIGS. 9 and 10 are schematic flow diagrams of a train of reactors.

Referring to FIG. 6, fresh hydrotreating catalyst is loaded in fresh catalyst containers, bins, or vessels 400 at a catalyst manufacturing facility 20 or supply house 22 and transported by flatbed truck 24 and railroad 26 to a staging area complex facility and warehouse 28 of an oil refinery 30 surrounded by aboveground tanks 32. The fresh catalyst containers are unloaded and removed from the flatbed trucks at the staging area facility by grab hooks 34 (FIG. 3) of a mobile bridge crane 36 and placed on an intelligence pad 38 where it is weighed by a weight scale 40 that is operatively connected to a central processing unit 42 comprising a computer 44 and a logic control board 46. The weight scale and central processing unit cooperate and interface with each other to determine whether the containers are empty or partially or fully fitted with fresh or spent catalyst. A catalyst indicating pin 48 extending from the base of the fresh catalyst container engages a limit switch 50 on the intelligence pad, which is also operatively connected to the central processing unit, to electronically detect the type of catalyst contained in the fresh catalyst bin.

The fresh catalyst bin is then lifted off the intelligence pad and raised to the underside of an overhead monorail 52 (FIG. 3) by the grab hooks 54 of a monorail transport carrier 56. The monorail transport carrier is operatively connected to the monorail trolley 58 by cable 60. The trolley and the grab hooks are operatively connected to the central processing unit and are remotely and automatically controlled. The trolley and grab hooks also have manual override safety controls.

Each fresh catalyst container is carried by the overhead monorail from the staging area facility to a remote control, computerized lift elevator 62. The lift elevator raises the fresh catalyst container to a tilting mechanism and discharge assembly 64 or 66 where the fresh catalyst contents of the bin are dumped into one of two fresh catalyst silos 68 or 70 depending on the type (composition) of the catalyst. The empty fresh catalyst containers are returned to the staging area, catalyst vendors and suppliers by reversing the above procedure.

The fresh catalyst is pneumatically conveyed from the silo through pneumatic transfer vessels 71–74 to a surge hopper 76 or 78 with nitrogen gas from nitrogen gas injectors 80. Smaller particles of the fresh catalyst are removed by vibrating screens 82 or 84. Larger particles of fresh catalyst are passed to a storage hopper 86 or 88 from which they are fluidly conveyed to the reactors of a resid hydrotreating unit (RHU) by a heavy vacuum gas oil slurry.

As best shown in FIG. 7, each resid hydrotreating unit 90, 92 and 94 is a reactor train comprising a cascaded series or set of three ebullated bed reactors 96, 97 and 98. Hydrogen is injected into the ebullated bed reactors through feed line 100. A relatively high sulfur resid or sour crude is fed to the reactor where it is hydroprocessed (hydrotreated) and ebullated in the presence of the fresh and/or equilibrium catalyst and hydrogen to produce an upgraded effluent product stream leaving spent catalyst. As used throughout this patent application, the term "equilibrium catalyst" means a fresh catalyst which has been partially or fully used. The term "spent catalyst" as used in this patent application comprises equilibrium catalyst which has been withdrawn from the reactor. Hydroprocessing in the RHU includes demetallation, desulfurization, and hydrocracking. Hydroprocessing can convert most of the feedstock to lighter more valuable products, such as gasoline, distillates, catalytic cracker feed, and petroleum feedstocks. The remaining portion of the products can be charged to cokers.

The resid hydrotreating units and associated refining equipment of FIG. 7 comprise three identical parallel trains of cascaded ebullated bed reactors 90, 92 and 94, as well as hydrogen heaters 101, influent oil heaters 102, an atmospheric tower 103, a vacuum tower 104, a vacuum tower oil heater 105, a hydrogen compression area 106, oil preheater exchangers 107, separators 108, recycled gas compressors 109, flash drums 110, separators 111, raw oil surge drums 112, sponge oil flash drums 113, amine absorbers and recycle gas suction drums 114, and sponge absorbers and separators 115.

Each of the reactor trains comprises three ebullated bed reactors in series. The feed typically comprises resid. Recycle gas can also be injected into the reactors along with the hydrogen gas. Demetallation primarily occurs in the first ebullated bed reactor in each train. Desulfurization primarily occurs in the second and the third ebullated bed reactors in each train. The effluent product stream typically comprises light hydrocarbon gases, hydrotreated naphtha, distillates, light and heavy gas oil, and uncoverted resid. The hydrotreating catalyst typically comprises a hydrogenating component on a porous refractory, inorganic oxide support.

The resid hydrotreating unit is quite flexible and, if desired, the same catalyst can be fed to one or more reactors or a separate demetallation catalyst can be fed to the first reactor while a desulfurization catalyst can be fed to the second and/or third reactors. Alternatively, different catalysts can be fed to each of the reactors, if desired. The used spent catalyst typically contains or is covered with nickel, sulfur, vanadium and carbon (coke). As much as 50 tons of catalyst are transported into, out of, and replaced in the ebullated bed reactors daily.

In use, fresh hydrotreating catalyst is fed downwardly into the top of the first ebullated bed reactor 96 (FIG. 8) through the fresh catalyst feed line 118. Hot resid feed and hydrogen enters the bottom of the first ebullated bed reactor 96 (FIG. 8) through feed line 100 and flows upwardly through a distributor plate 119 into the fresh catalyst bed 120. The distributor plate contains numerous bubble caps 121 and risers 122 which help distribute the oil and the gas generally evenly across the reactor. An ebullating pump 123 circulates oil from a recycle pan 124 through a downcomber 125 and the distributor plate 119. The rate is sufficient to lift and expand the catalyst bed from its initial settled level to its steady state expanded level. The effluent product stream of partially hydrotreated oil and hydrogen-rich gases are withdrawn from the top of the reactor through effluent product line 126. The used spent catalyst is withdrawn from the bottom of the reactor through spent catalyst discharge line 127. The spent catalyst typically contains deposits of metals, such as nickel and vanadium, which have been removed from the influent feed oil during hydrotreating.

Catalyst particles are suspended in a two-phase mixture of oil and hydrogen rich gas in the reaction zone of the reactor. Hydrogen gas typically continually bubbles through the oil. The random ebullating motion of the catalyst particle results in a turbulent mixture of the three phases which promotes good contact mixing and minimizes temperature gradients.

The cascading of the ebullated bed reactors in a series of three per reactor train, in which the effluent of one reactor serves as the feed to the next reactor, greatly improves the catalytic performance of the backmixed ebullated bed process. Increasing the catalyst replacement rate increases the average catalyst activity.

Figure 10:
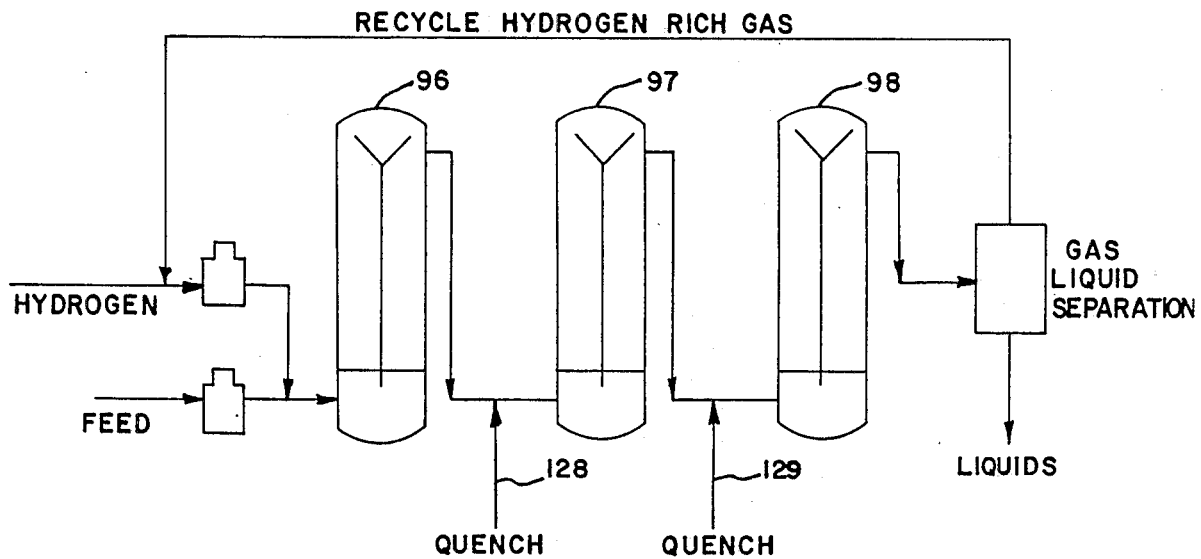

As shown in FIGS. 9 and 10, the partially hydrotreated effluent of the first ebullated bed reactor 96 comprises the influent feed of the second ebullated bed reactor 97. The partially hydrotreated effluent of the second ebullated bed reactor 97 is the influent feed of the third ebullated bed reactor 98. The second and third reactors are functionally, operatively, and structurally similar to the first reactor and cooperate with the first reactor to effectively hydrotreat and upgrade the influent feed oil. Quench liquid (oil) and/or vapor can be injected into the influent feeds of the second and third reactors through quench lines 128 and 129 (FIG. 10) to cool and control the bulk temperatures in the second and third reactors. Fresh catalyst can be fed into the top of all the reactors, although for process efficiency and economy it is preferred to utilize catalyst staging by feeding fresh catalyst into the first and third reactors through fresh catalyst feed lines 100 and 130 (FIG. 9) and by feeding recycled spent catalyst from the third reactor into the second reactor through recycle catalyst line 131. For best results, the catalyst is fed downwardly into the ebullated bed reactor in countercurrent flow relationship to the influent oil and hydrogen feed. Used spent catalyst is discharged from the reactor through spent catalyst discharge lines 127 and 127'.

Preferably, vacuum resid is heated in the oil heater 102 (FIG. 7) and hydrogen is heated in the hydrogen heater 101 before being combined and fed through the feed line 100 into the first reactor, for process efficiency. The effluent product streams can be withdrawn from the bottoms or tops of the reactors, as preferred.

The fluid state of the ebullated hydrotreating catalyst enhances the flexibility of the ebullated bed reactors and permits the addition or withdrawal of oil slurry and catalyst without taking the reactors offstream. Daily catalyst replacement results in a steady state equilibrium catalyst activity.

Products are withdrawn from the bottom or top of the third reactor 98 and are separated into fractions of oil and gas in the towers and other processing equipment previously described.

The ebullated bed reactors are capable of handling atmospheric and vacuum resids from a wide range of sour and/or heavy crudes. Such crudes can have a gravity as much as 20° API, a sulfur content ranging up to 8% by weight, and substantial amounts of nickel and vanadium. The ebullated bed reactors typically operate at a temperature above 700° F. and at a hydrogen partial pressure greater than 1500 PSIA.

Ebullated bed reactors have many advantages over fixed bed reactors. They permit operation at higher average temperatures. They permit the addition and withdrawal of catalyst without necessitating shutdown. They avoid plugging due to dirty feed.

Since the liquid resid feed does not usually have enough velocity to expand the catalyst bed above its settled level, liquid is recycled from the top of the reactor to the bottom of the reactor through a downcomer pipe and then pumped back up through the reactor at a sufficient velocity to attain the required degree of expansion.

The products produced from the resid hydrotreating units in the ebullated bed reactors include light hydrocarbon gases, light naphtha, heavy naphtha, light distillate, mid-distillate, diesel oil, light vacuum gas oil, heavy vacuum gas oil, and 1000+° F. resid. The light hydrocarbon gases and light naphtha can be fed into a vapor recovery unit. Heavy naphtha can be sent to a reformer. The mid-distillate oil is useful for producing diesel fuel and furnace oil, as well as for conveying and/or cooling the spent catalyst. Light and heavy vacuum gas oils are useful as feedstock for a catalytic cracker. The 1000+° F. resid can be sent to cokers to produce coke.

After the fresh hydrotreating catalyst has been used to hydrotreat and upgrade the influent feed oil, the spent equilibrium catalyst is removed and loaded into spent catalyst containers, bins, or vessels 500 (FIG. 3) on other intelligence pads 38. The spent catalyst containers are lifted from the intelligence pads at the deoiling station and spent catalyst-loading zone 132 to the spent catalyst return section 134 of the overhead monorail 52 by the grab hooks 54 of the monorail transport carrier 56. The spent catalyst containers are transported, carried, and returned by the overhead monorail to the staging area complex 28 where the containers are loaded onto a flatbed truck and shipped to a reclamation site or disposal facility for reclamation and/or disposal of the spent catalyst. The empty spent catalyst containers are returned to the deoiling station by reversing the above procedure.

In order to increase product yield and prevent residual reactor oil from spilling and dripping from the spent catalyst container onto the nation's highways, the spent catalyst is substantially deoiled before being loaded into the spent catalyst containers. To this end, special deoiling equipment 134, 136 and 138 (FIG. 3) comprising a deoiling system is operatively connected and positioned downstream of the resid hydrotreating units 90, 92 and 94 (FIGS. 6 and 7). The deoiling equipment includes a high pressure transfer vessel 140 (FIG. 1), spent catalyst inventory vessels 142, 144 and 146 (FIG. 3), inventory flows valves 148, 150 and 152, cooling drums or vessels 154, 156 and 158, cooling drum-outlet valves 160, 162 and 164, spiral classifiers 166, 168 and 170 having inlet feedhoppers 172, 174 and 176 and screw conveyors 178, 180 and 182 positioned at an incline within screw-conveyor housing-sections 184, 186 and 188, swingable (pivotable) spiral discharge chutes 190, 192 and 194 pivotally connected to the top of the housing-sections of the spiral classifiers, intelligence pads 38 with upright guide posts for holding spent catalyst containers, weigh scales 40 at the bottom of the intelligence pads operatively connected to the logic control board 46 and computer 44 of the central processing unit 42, a water-cooled heat exchanger or water cooler 196 (FIG. 1), a water cooler-inlet valve 198, a cooling drum inlet valve 200, one or more surge drums 202, 204 and 206 (FIG. 3), recycle centrifugal pumps 208, 210 and 212 and various interconnecting transfer lines, pipes, and conduits. The water cooler 196 can also be connected and communicate with the inlet feed line 220 through line 213 to cool the slurry of mid-distillate diesel oil and spent catalyst to a desired temperature below the flash point of the diesel oil before the diesel oil enters the inventory silo 142. A motor 214 (FIG. 1) rotatably drives the screw conveyors of the spiral classifiers.

The first reactor 96 (FIG. 9) is operatively associated with and connected to the deoiling equipment shown in FIG. 1 as well as to a pair of intelligence pads 38 (FIG. 2). The second and third reactors 97 and 98 are each operatively associated and connected to similar deoiling equipment such as those shown downstream of vessels 144 and 146, respectively (FIG. 3).

In the deoiling process, a slurry of spent catalyst and effluent reactor oil is withdrawn from the ebullated bed reactors and fed through a spent catalyst slurry line 216 (FIG. 1) to the high-pressure catalyst-transfer vessel 140 where it is cooled to a temperature above the 165° F. flashpoint of mid-distillate diesel oil, preferably to about 180° F. The cooled slurry is withdrawn from the transfer vessel 140 through discharge line 218 and conveyed with some mid-distillate diesel oil from diesel line 219 through transfer line 220 to the spent catalyst inventory vessel 142. The slurry is withdrawn from the inventory vessel 142 and gravitated to the cooling drum 154 via control valve 148 and lines 221 and 222. Positioned within the interior of the cooling drum is a vibrating tuning fork probe 224 which is operatively connected to the central processing unit. The vibrating tuning fork probe has two tines (fork-sections) 225 and 226 which are driven by two piezoelectric crystals 227 at the tines' resonance frequency. The tines extend into the oil-catalyst slurry in the interior of the cooling drum. The tuning fork probe can be mounted horizontally or vertically and is preferably positioned so that the tines are located at or slightly below the lower 250 ft.$^3$ volume in the cooling drum so as to avoid overfilling the feed hopper 172 of the spiral classifer. When the solid catalyst particles closely surround the tines at a sufficient thickness, density, and concentration, the tines cease to vibrate and a third piezoelectric crystal 228 becomes de-energized thereby activating a relay 229 operatively connected to the control valve 148 and the central processing unit. The vibrating tuning fork probe can respond in less than one-half second. The vibrating tuning fork probe electronically detects the presence or absence of spent catalyst and controls the amount of spent catalyst in the cooling drum. When the amount of spent catalyst sensed by the vibrating tuning fork probe has reached a preselected level, the flow of slurry from the inventory vessel 142 into the cooling drum 154 is blocked and stopped by control valve 148 operatively connected to the vibrating tuning fork probe and the central processing unit.

The slurry of catalyst and oil in the cooling drum 154 (FIG. 1) is cooled to a temperature below the flashpoint of the mid-distillate diesel oil, preferably to about 130° F. The cooling of the slurry is accomplished in the cooling drum by circulating and pumping a cooling oil comprising cooled mid-distillate diesel oil from oil lines 232–234 in direct heat exchange contact with the slurry in the drum 154. The effluent cooling oil is withdrawn from the cooling drum through effluent oil lines 236 and 238 and circulated through the water-cooled heat exchanger 196 where the effluent cooling oil is cooled. The cooled effluent oil is passed from the heat exchanger 196 to the spent catalyst surge drum 202.

The cooled slurry from the cooling drum 154 (FIG. 1) is conveyed by gravity flow through lines 240 and 242 to the feedhopper 172 of the spiral classifier 166. The cooled slurry is spirally conveyed from the feedhopper with the rotating screw conveyor blades 178 of the spiral classifier at an upward angle of inclination ranging from 15° to 60°. As this occurs, a substantial amount of the mid-distillate diesel oil from the spent catalyst is removed and drained to substantially deoil the spent catalyst. The removed oil is conveyed by gravity flow at a downward angle of inclination, generally opposite the angle of inclination of the screw conveyor 178, through the clearance around the circumference of the screw conveyor blades 178 along with bottom interior surface of the screw-conveyor housing-section 184. The removed oil flows in a general countercurrent flow relationship to the upwardly conveyed catalyst slurry.

The level of spent catalyst in the feedhopper 172 (FIG. 1) can be detected by thermal probes 246 and 248. The thermal probes include a high level catalyst indicator 246 and a low level catalyst indicator 248. The level of mid-distillate oil in the feedhoppers are detected by capacitance probes 250 and 252. There is a high liquid level indicator 250 and a low liquid level indicator 252. The probes are necessary in order to avoid passing catalyst to the pump 208 which could severally damage the pump and shutdown the deoiling system. When the low level catalyst indicator senses a low level of catalyst, the removed oil is recycled and drained from the feedhopper 172 through the drain line 254 into the surge drum 202. The capacitance probes are electrically connected to the feed valve 160 and serve as safety controls to close the feed valve when the high level capacitance probe 250 has detected a high level or overfill condition in the feedhopper and prevents the feed valve from opening and overfilling the feedhopper when the low level capacitance probe 252 has detected catalyst and oil already present in the feedhopper (i.e., when the feedhopper is not empty).

The tuning fork probe 224 and the cooling drum 154 also serve as safety controls to electronically close the cooling drum valve 148 when about 250 cubic feet of catalyst slurry has filled the cooling drum to avoid overloading and damaging the spiral classifier.

Preferably, the feedhopper 172 (FIG. 1) is blanketed with nitrogen from nitrogen feed line 256 to remove hydrocarbon gases so as to enhance operator safety. A nitrogen purge is injected into the inventory vessel 142 through nitrogen purge line 258 to attain the desired pressure and help prevent oxygen from entering the inventory vessel 142. The cooling drum 154 can also be blanketed and purged with nitrogen, such as from nitrogen line 258, while the cooling drum is emptied to prevent ingress of oxygen into the cooling drum. The spiral classifer can also have a vent to discharge vapors at an elevated height away from the operator.

The flow of deoiled catalyst is directed and dispensed at a downward angle of inclination by gravity from the top of the spiral classifier 166 (FIG. 1) through the discharge chute 190 into the top of a first spent catalyst container 500. The weight of the spent catalyst container is continuously sensed through the weigh scale 40 while the deoiled catalyst is fed into the spent catalyst bin. The weigh scale is operatively connected via the central processing unit to the motor 214 of the spiral classifier and optionally to cooling drum valve 160. The weigh scale, in cooperation with the central processing unit, de-energizes and stops the motor and optionally activates the flow valve to stop, shut off, and block the flow of deoiled catalyst into the container when the container being loaded with spent catalyst has reached a preselected weight. Thereafter, the discharge chute is pivoted to a position above the second spent catalyst container, as shown by the dotted line in FIG. 2, and the deoiled catalyst is directed and dispensed through the discharge chute into the second spent catalyst container in a similar manner.

As the spent catalyst containers are filled to their desired weights, the tops of the containers are closed with a closure lid or cap. The spent catalyst containers are then grasped and lifted by the grab hooks 54 (FIG. 3) of the monorail transport carrier 56 and raised to the trolley 58 of an overhead monorail 52 where they are transported to the staging area complex facility 28.

The above resid hydrotreating unit and deoiling process has been built, constructed, and extensively tested in the Amoco Oil Company Refinery at Texas City, Tex. The resid hydrotreating unit and deoiling process have commenced commercial operations within the past year and have produced unexpectedly good results. The spiral classifier has reduced the reactor oil content from 200 weight % reactor oil to catalyst ratio in the influent feed slurry to the spent catalyst inventory vessels to less than 5 to 10 weight % reactor oil remaining on the catalyst surface. The resid hydrotreating unit and deoiling process have been commercially successful to process and upgrade substantial quantities of sour crude and resid into gasoline and other valuable petroleum products in order to decrease America's dependence on foreign oil from Saudi Arabia, Nigeria, etc.

Although embodiments of this invention have been shown and described, it is to be understood that various modifications and substitutions, as well as rearrangements of parts, components, equipment, and/or process steps, can be made by those skilled in the art without departing from the novel spirit and scope of this invention.

What is claimed is:

1. A deoiling process, comprising the steps of:
   removing a slurry of spent catalyst and oil from an ebullated bed reactor;
   transporting said slurry of spent catalyst and oil from said reactor to a vessel;
   cooling said slurry of spent catalyst and oil in said vessel to a temperature below the flash point of said oil;
   conveying said cooled slurry at an upward angle of inclination in a screw conveyor in a spiral flow pattern while countercurrently draining oil from said slurry to substantially separate said oil from said spent catalyst; and
   discharging said spent catalyst from said screw conveyor into a bin after said oil has been substantially separated from said spent catalyst.

2. A deoiling process in accordance with claim 1 wherein said slurry is cooled in said vessel with water before being conveyed in said screw conveyor.

3. A deoiling process in accordance with claim 1 wherein said slurry is cooled with oil in said vessel before being conveyed in said screw conveyor.

4. A deoiling process in accordance with claim 1 including weighing said deoiled spent catalyst in said bin.

5. A deoiling process in accordance with claim 4 wherein said bin is continuously weighed as said deoiled spent catalyst is discharged into said bin and said discharging and conveying is terminated when the weight of said bin has attained a predetermined level.

6. A deoiling process, comprising the steps of:
   fluidly conveying fresh hydrotreating catalyst in a heavy vacuum gas oil slurry to a reactor train comprising a series of three ebullated bed reactors;
   feeding a relatively high sulfur resid to said ebullated bed reactors;
   injecting hydrogen into said ebullated bed reactors;
   hydrotreating and ebullating said resid in said reactors in the presence of said catalyst and hydrogen to produce an upgraded effluent product stream comprising reactor oil leaving spent catalyst;
   separating said product stream in an atmospheric tower into fractions of gas and oil including a fraction of mid-distillate diesel oil;
   removing a slurry of spent catalyst and reactor oil from said reactors and feeding said slurry to a high-pressure catalyst-transfer vessel;
   cooling said slurry in said catalyst-transfer vessel to a temperature above the flash point of said mid-distillate oil;
   conveying said slurry with some of said mid-distillate oil to an inventory vessel;
   gravitating said slurry from said inventory vessel to a cooling drum-vessel;

electronically controlling the amount of spent catalyst in said cooling drum-vessel with a vibrating tuning fork probe;

blocking and stopping the flow of said slurry into said cooling drum-vessel from said inventory vessel when the amount of spent catalyst sensed by said vibrating tuning fork probe has reached a preselected level;

cooling said slurry in said cooling drum-vessel to a temperature below the flash point of said mid-distillate oil by circulating a cooling oil comprising cooled mid-distillate oil in said cooling drum-vessel in direct heat exchange contact with said slurry;

withdrawing said cooling oil from said cooling drum-vessel;

circulating said cooling oil through a water-cooled heat exchanger to substantially lower the temperature of said cooling oil to provide said cooled oil;

pumping said cooled oil to a surge drum;

conveying said cooled slurry by gravity flow from said cooling drum-vessel to a feedhopper of a spiral classifier;

spirally conveying said cooled slurry from said feedhopper at an upward angle of inclination with said spiral classifier while simultaneously draining and removing a substantial amount of mid-distillate oil from said spent catalyst to substantially deoil said catalyst;

conveying said removed oil at a downward angle of inclination by gravity flow through the screw-conveyor housing-section of said spiral classifier to said feedhopper in general countercurrent flow relationship to said upwardly conveyed slurry;

recycling said removed oil from said feedhopper to said surge drum;

directing the flow of said deoiled catalyst generally downwardly by gravity from said spiral classifier through a discharge chute into the top of a spent catalyst container;

continuously sensing the weight of said spent catalyst container while said deoiled catalyst is being directed into said container; and stopping the flow of said deoiled catalyst into said container when said sensed weight has reached a preselected level.

7. A deoiling process in accordance with claim 6 wherein said feedhopper is blanketed with nitrogen to remove hydrocarbon gases.

8. A deoiling process in accordance with claim 6 wherein a nitrogen purge is injected into said inventory vessel and oxygen is substantially prevented from entering said inventory vessel.

9. A deoiling process in accordance with claim 6 wherein said deoiled catalyst is directed through a second discharge chute to a second spent catalyst container after said flow to the first container has stopped, said second spent catalyst container is continuously weighed as said deoiled catalyst is directed into said second container, and said flow to said second container is stopped when said weight of said second container has reached said preselected level.

10. A deoiling process in accordance with claim 9 wherein said containers are removed by an overhead monorail.

11. A deoiling process in accordance with claim 10 including detecting the level of spent catalyst in said feedhopper with thermal probes.

12. A deoiling process in accordance with claim 10 including detecting the level of mid-distillate oil in said feedhopper with capacitance probes.

13. A deoiling process in accordance with claim 12 wherein said slurry in said cooling drum is substantially prevented from flowing into said feedhopper when one of said capacitance probes detects an overfill condition in said feedhopper.

14. A deoiling process in accordance with claim 12 wherein said slurry in said cooling drum is substantially prevented from flowing into said feedhopper when one of said capacitance probes detects the presence of oil and catalyst in said feedhopper.

* * * * *

UNITED STATES PATENT OFFICE
CERTIFICATE OF CORRECTION

Patent No.    4,661,265            Dated    April 28, 1987

Inventor(s) CARL B. OLSON, ROMAN T. PLICHTA and DANIEL W. COYNE

It is certified that error appears in the above-identified patent and that said Letters Patent is hereby corrected as shown below:

Patent

| Column | Line | | |
|---|---|---|---|
| 1 | 68 | "3,322.,283," should be | -- 3,322,283, -- |
| 8 | 67 | "severally" should be | -- severely -- |
| 12 | 12-13 | "enter-ing, said" delete comma (hyphen there because of line break) | |

Signed and Sealed this

Twenty-seventh Day of February, 1990

*Attest:*

JEFFREY M. SAMUELS

*Attesting Officer*      *Acting Commissioner of Patents and Trademarks*